United States Patent [19]

King et al.

[11] 4,009,521

[45] Mar. 1, 1977

[54] INTERCONNECTED RESPONSE RECORDING AND DISPLAY CONSOLES

[75] Inventors: John E. King, Fairport; Herbert W. Watkins, Pittsford, both of N.Y.

[73] Assignee: The Singer Company, New York, N.Y.

[22] Filed: Aug. 20, 1975

[21] Appl. No.: 606,038

[52] U.S. Cl. .................................. 35/8 R; 35/22 R
[51] Int. Cl.[2] .......................................... G09B 5/00
[58] Field of Search ................. 35/5, 6, 8 R, 22 R, 35/30, 35 C; 200/314

[56] References Cited

UNITED STATES PATENTS

| | | | |
|---|---|---|---|
| 2,931,108 | 4/1960 | Brown | 35/5 |
| 3,080,661 | 3/1963 | Conrath | 35/6 |
| 3,271,530 | 9/1966 | Wirsching | 200/314 |
| 3,355,821 | 12/1967 | Buenger | 35/30 |
| 3,595,120 | 7/1971 | Martin et al. | 35/5 X |
| 3,600,592 | 8/1971 | Mahan et al. | 35/5 |
| 3,600,826 | 8/1971 | Thomas | 35/22 R |
| 3,660,913 | 5/1972 | Heath | 35/30 |
| 3,663,780 | 5/1972 | Golbeck | 200/314 |
| 3,921,310 | 11/1975 | Smeda et al. | 35/22 R X |

*Primary Examiner*—Anton O. Oechsle
*Assistant Examiner*—Vance Y. Hum
*Attorney, Agent, or Firm*—Charles R. Lewis; Edward L. Bell

[57] ABSTRACT

A group of interconnected consoles for the selective anonymous transmitting and receiving of keyboard responses between the members of a group. The consoles are adaptable to a variety of group communication situations including testing, training, education, and evaluation. Each console includes a plurality of depressable keys in the form of a keyboard, and an illuminatable lamp associated with each key position. When a key is depressed, the associated lamp illuminates to indicate the recording of a response. Each console also includes a first switch to select a mode for transmitting keyboard responses and a second switch to select a mode for receiving keyboard responses. Each group member may perform one or more of the following functions: a) depress one or more keys to record his response to printed instructions adjacent each key; b) select the transmit mode to transmit lamp illuminating signals representing each depressed key to associated lamps on each of the other consoles operating in the receiving mode; and/or c) select the receiving mode to receive lamp illuminating signals representing depressed keys on each of the other consoles operating in the transmit code. Group members may thus transmit and receive keyboard responses from one another. The group member electing to receive lamp illuminating signals observes a lamp illuminate for each key position corresponding to a depressed key on the transmitting keyboard but cannot associate the appearance of an illuminated lamp with another group member. Thus, each group member choosing to transmit evidence of his keyboard responses has a reasonable assurance of anonymity.

18 Claims, 17 Drawing Figures

INTERCONNECTED RESPONSE RECORDING AND DISPLAY CONSOLES

BACKGROUND OF THE INVENTION

1. Field of the Invention

The present invention relates to individually operated interconnected keyboard consoles. Each console has a plurality of keys and associated indicator lamps whereby each console operator may anonymously transmit and receive keyboard responses with one or more of the other operators.

2. Prior Art

In the field of human communication, people may gather into a group to communicate with one another. In such a group situation, means may be utilized by each group member to assist them in communicating with one another. Such means may include response recording and displaying consoles. Examples of such consoles are disclosed in U.S. patent application Ser. No. 499,244, filed Aug. 21, 1974, by Smeda, et al., now U.S. Pat. No. 3,921,310, the disclosure of which is incorporated herein by reference, wherein, consoles are described that provide each group member with a plurality of actuatable keys arranged into a keyboard, with an indicator lamp associated with each key position. When an operator depresses a key(s) to the response recording position, the associated indicator lamp(s) illuminate to provide an indication to the operator of a recorded response. A switch means is provided whereby the operator of the console can elect to cause corresponding lamps on all of the other consoles to illuminate. Each console is provided with an observation shield. The shield prevents an operator from observing another operator's keyboard, indicator lamps, or hand or finger movements during key and switch actuation. The shield does not prevent observation of an operator's facial expression, arm, or body movement during key and switch actuation.

The ability to transmit lamp illuminating signals allows each group member to communicate with one another. While the consoles provide switch means to control the transmission of responses, no means is provided for an operator to prevent the reception of signals transmitted by another operator or operators. A feature which would allow an operator to prevent the reception of signals transmitted from another console(s) would provide many advantages. One such desirable advantage is in the preservation of anonymity.

For reasons discussed in the referenced application, it is desirable in certain group communication situations to preserve the anonymity of the operator who is transmitting responses. It was discovered that operators of the consoles receiving responses could discover the identity of a console operator electing to transmit responses. The following supposititious example illustrates.

Eight console operators A, B, C, D, E, F, G, and H are each seated at a table. The tables are arranged to form a circle. A console is mounted on each table. In this circular configuration, each operator can readily verbally communicate with the other, and observe the others facial expression, body, and arm movements. Because of the observation shield, an operator cannot observe the other's keyboard, indicator lamps, or hand or finger movements during key and switch actuation. In this example, the operators A to G are to make responses on their keyboard indicating their evaluation of H's sociability, and thereafter transmit their responses to H. H is a high ranking military officer known for his vindictive unsociability, and A to G are lowest rank soldiers. A to G, in accordance with their feelings about H, make responses on their keyboards. A to G then substantially simultaneously switch into a group display mode whereby they substantially simultaneously transmit their responses to H, and H substantially simultaneously observes lamps illuminate on his console. It has been discovered that in a percentage of trials H could associate at least one of the operators with a response received on his console. It proved difficult for a plurality of operators to switch substantially simultaneously into a response transmitting mode. Some operators switched into the transmitting mode either prior to or subsequent to the time interval that the majority of operators switched into the transmitting mode. The observation shield prevented the person receiving the responses, in this case H, from observing another's keyboard, or hand and finger movement during key and switch actuation. As described above, the observation shield did not prevent H from observing another's facial expression, body, and arm movement. Thus, H could simultaneously observe his indicator lamps with his peripheral vision and the facial expression, body, and arm movement of the other operators.

The receiving operator had the opportunity to associate changes in the facial expression, body, and arm movement of the other operators with the appearance of illuminated lamps on his keyboard. Operators, upon learning that their anonymity could be compromised would modify their responses. In the example above, A to G would modify their responses to avoid the disapproval of H, or seek the approval of H.

The above example illustrates the problem of preserving the anonymity of an operator electing to transmit responses associated with the consoles described above.

SUMMARY OF THE INVENTION

In accordance with the present invention a group of individually operated interconnected response recording and response displaying consoles enable selective and anonymous transmitting and receiving of responses among the operators of the consoles. Each console includes a plurality of systematically positioned response recording means actuatable to and from a response recording state. A console operator may record his response by actuating selected response recording means to the response recording state. A response display means is associated with each of the response recording means on a console and enters the response indicating state when an associated response recording means is actuated to the response recording state by the console operator. A first switch means actuatable between a transmitting mode and a non-transmitting mode allows the console operator to elect to anonymously transmit response indicating signals to the remaining response recording and display consoles. A second switch means actuatable between a receiving and a non-receiving mode allows the console operator to elect to receive response indicating signals being transmitted from other consoles. Depending upon the mode of operation, a console operator may neither transmit nor receive, only transmit, only receive, or both transmit and receive response indicating signals.

BRIEF DESCRIPTION OF THE DRAWINGS

The present invention will be fully understood from consideration of the following detailed description taken in conjunction with the accompanying drawings, in which like reference characters refer to like parts in the several views, and wherein;

FIG. 10 is a profile view of a receive switch, and, FIG. 11 is a front elevational view of a control with a dust shield.

DESCRIPTION OF THE PREFERRED EMBODIMENT

Figure 1:
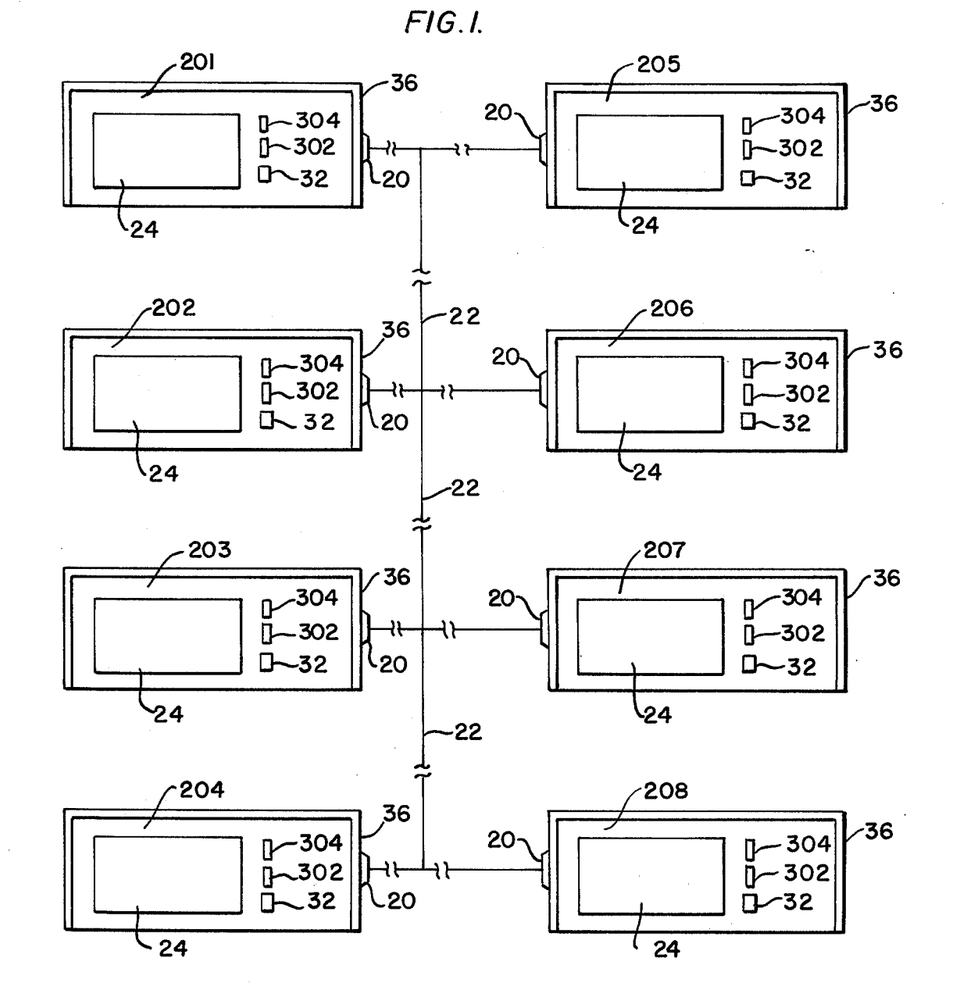
FIG. 1 is a schematic plan view showing eight interconnected response recording and display consoles.
Figure 2:
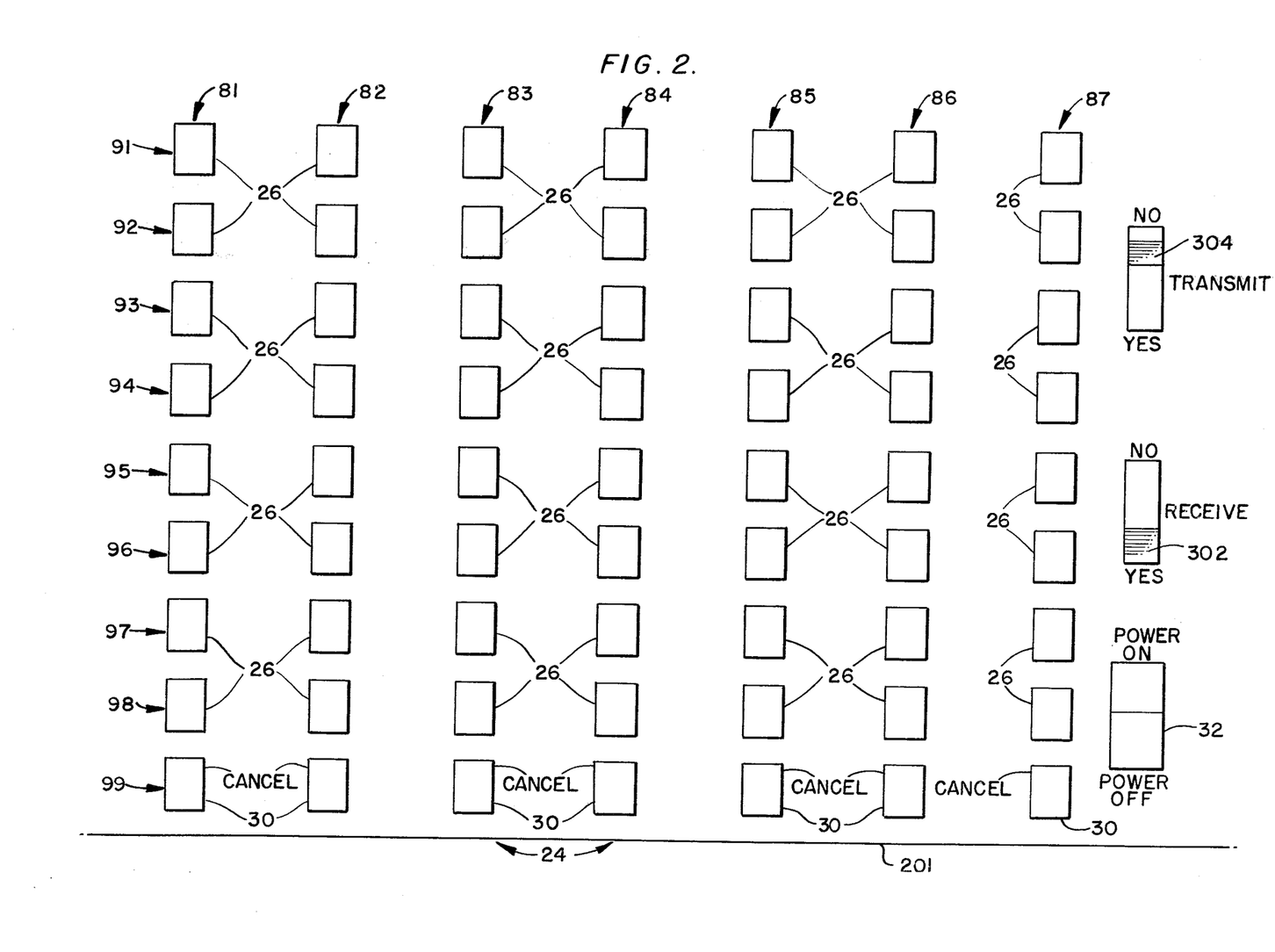
FIG. 2 illustrates a typical keyboard for a response recording and display console shown in FIG. 1.

As shown in FIG. 1, a preferred embodiment in accordance with the present invention includes eight response recording and display consoles 201, 202, 203, 204, 205, 206, 207 and 208 interconnected through electrical connectors 20 and an electrical cable 22. As shown in FIG. 2, each of the consoles 201–208 has a keyboard 24 which has seven columns 81, 82, 83, 84, 85, 86, and 87, and eight rows 91, 92, 93, 94, 95, 96, 97 and 98 of response recording keys 26 and a row 99 of cancel keys 30. The number of consoles, as well as the number of the recording keys 26 and the cancel keys 30 utilized is discretionary. A two-position power switch 32, a two-position receive control 302, and a two-position transmit control 304 are located to the right of the column 87. The power switch 32 has an OFF position and an ON position. In the ON position, electrical power is supplied to the console by a power supply circuit described below. Both the receive control 302 and the transmit control 304 has a "YES" and a "NO" position. The function of the YES and the NO positions is explained below.

The location of a recording key 26 or a cancel key 30 on the keyboard 24 is hereinafter identified by its row number and its column number, with both numbers in parentheses. For example, the location of the first key 26 in the first column 81 of FIG. 2 is identified as (91: 81). A recording key 26 or a cancel key 30 on a particular console is identified by the console number in parentheses followed by the location identifier. For example, the location of the first recording key 26 in the first column 81 on the console 201 is identified as (201) (91:81). In a like manner where it is necessary to identify an element with a particular console, the console number in parentheses will precede the element reference number. When referring to a console, keyboard, recording key, switch or control in a generic sense, the appropriate word will be used without an annexed reference numeral.

An example below demonstrates the use of a group of consoles 201–208 to allow the communication of keyboard 24 responses among the members of the group. Before this group communication example is presented, the function of the console recording keys 26, the cancel keys 30, the receive control 302 and the transmit control 304 is described.

Figures 5A, 5B, 5C, 6:
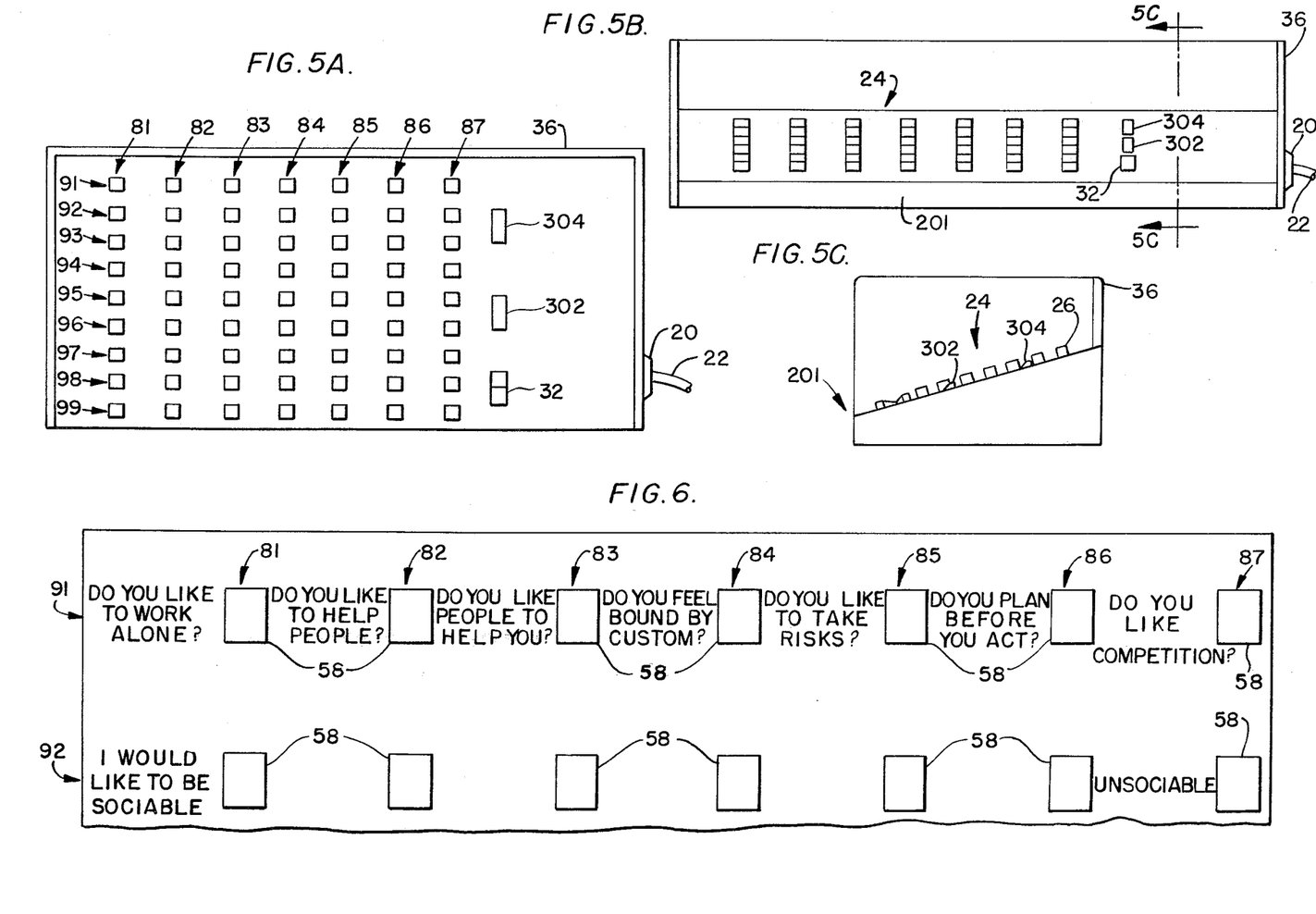
FIG. 5A is a top view of a typical response recording and display console.
FIG. 5B is a frontal view of the typical response recording and display console illustrated in FIG. 5A.
FIG. 5C is a partial cross section profile view of the response recording and display console illustrated in FIG. 5B taken along the line 5C—5C.
FIG. 6 is a partial top view of a template having two rows of key apertures with representative questions adjacent selected apertures.

The operator of each console determines the communication significance attached to each recording key 26 by reading printed matter adjacent to each recording key 26. As shown in FIG. 6, the printed matter is carried on a replaceable template 56. FIG. 6 illustrates the upper portion of a template 56. The printed statements shown are merely representative of the many types of statements which may be utilized. The questions in the row 91 may be responded to by depressing the adjacent key 26. The statements in the row 92 may be responded to by depressing one of the keys 26 to indicate the relative magnitude of the operator's feeling. The template 56 is a thin sheet of material, preferably paper, having outside dimensions approximately equal to the dimensions of the keyboard 24. Each template 56 has a plurality of apertures 58 formed therein. The location of each aperture 58 corresponds with the location of a recording key 26 on the keyboard 24. The dimensions of each aperture 58 are larger than the dimensions of a recording key 26 such that each recording key 26 may extend through its corresponding aperture 58 to be surrounded by the solid portion of the template 56. A template 56 suitable for use with the preferred embodiment would have seven columns and eight rows of apertures 58. A portion of each template 56 adjacent to and to the left of each aperture 58 receives printed matter relating to the use of each recording key 26. The printed matter may include bi-valve questions as illustrated in the row 91 of FIG. 6, or multi-value questions as illustrated in the row 92 of FIG. 6. The bi-value questions may be responded to by depressing the recording key 26 adjacent to the instruction and the multi-value question may be responded to by depressing one recording key 26 in the row 92 as evidence of the magnitude of a response. The template 56 is easily placed over and removed from the keyboard 24. Many different sets of templates 56 may be prepared, with each set relating to a different group communication situation. The ready replaceability of the template 56 and the ease with which they may be manufactured make the group of consoles 201–208 adaptable to a wide variety of group communication situations.

Figure 3A:
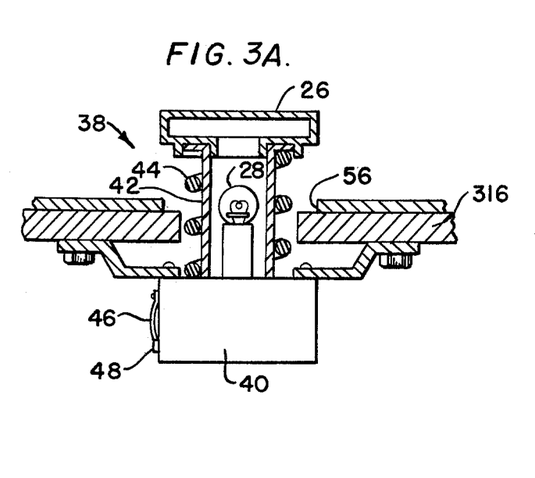
FIG. 3A is a cross section view of a typical keyboard key switch and indicator assembly.

Each recording key 26 is fabricated from translucent material, and as shown in FIG. 3A, has an illuminatable lamp 28 located below the recording key 26 surface. Each recording key 26 is reversibly actuatable to and from the depressed state. When a recording key 26 is depressed the lamp 28 beneath the depressed recording key 26 illuminates by means of an electric circuit described below. The illuminated lamp 28 serves to communicate the recorded response to the operator. The operator of a console, after reading the printed matter adjacent to each recording key 26, may depress one or more recording keys 26 and observe the lamps 28 beneath each depressed recording key 26 illuminate.

The operator of each console may elect to transmit responses to and/or receive responses from other consoles through the use of the receive control 302 and transmit control 304. When the transmit control 304 is in the NO position, no responses on the keyboard 24 can be transmitted to the other consoles. When the transmit control 304 is in the YES position, responses on the keyboard 24 can be transmitted to the remaining consoles. If a first console has a response recorded in the location (91:81) and its transmit switch 304 is in the YES position, a lamp 28 illuminating signal for the (91:81) location will be transmitted to all the remaining consoles from the first console. When the receive control 302 on a console is in the NO position, any responses being transmitted from the other consoles will not be received. When the receive control 302 is in the YES position, any responses being transmitted from the other consoles will be received. When a console receives a response being transmitted from another console, a lamp 28 on the receiving console will illuminate as evidence of the received response. For example, if a first console has a response recorded in the (91:81) location, its transmit control 304 in the YES position, and a second console has its receive control 302 in the YES position, then the lamp 28 in the (91:81) location of the second console will illuminate. If either the transmit control 304 of the first console or the receive control 302 of the second console is switched to the NO position, the illuminated lamp 28 in the location (91:81) on the second console will be caused to extinguish.

As shown in FIG. 5A, 5B and 5C, each console 201–208 is provided with an opaque observation shield 36 located on three sides. The shield 36 prevents an operator from observing another operator's keyboard 24, power switch 32, receive control 302, and transmit control 304. The shield 36 also prevents an operator from observing another operator's hand and finger movements during recording key 26, cancel key 30, switch 32, control 302, or control 304 actuation, but does not prevent observation of an operator's facial expression, arm or body movement.

The following example more fully illustrates the group communication feature of the consoles 201–208, including the anonymous transmitting and receiving of responses among the group members. The example is sufficient to demonstrate the communication capability between a plurality of consoles.

Figure 4A:
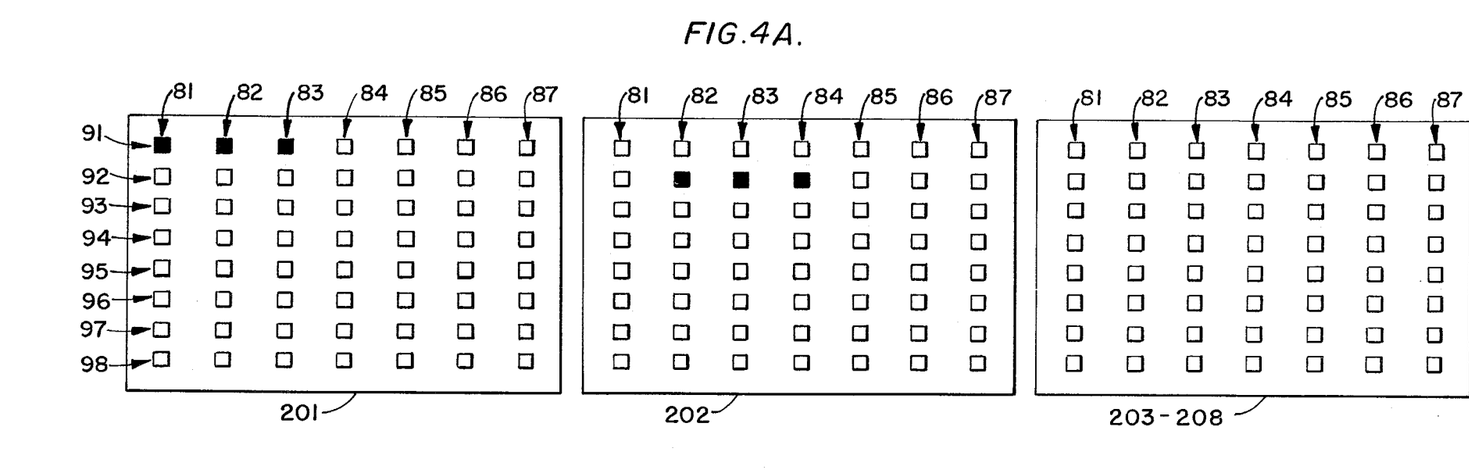
FIG. 4A is a schematic plan view showing three keyboards having 56 keys each with selected keys actuated.
Figure 4B:
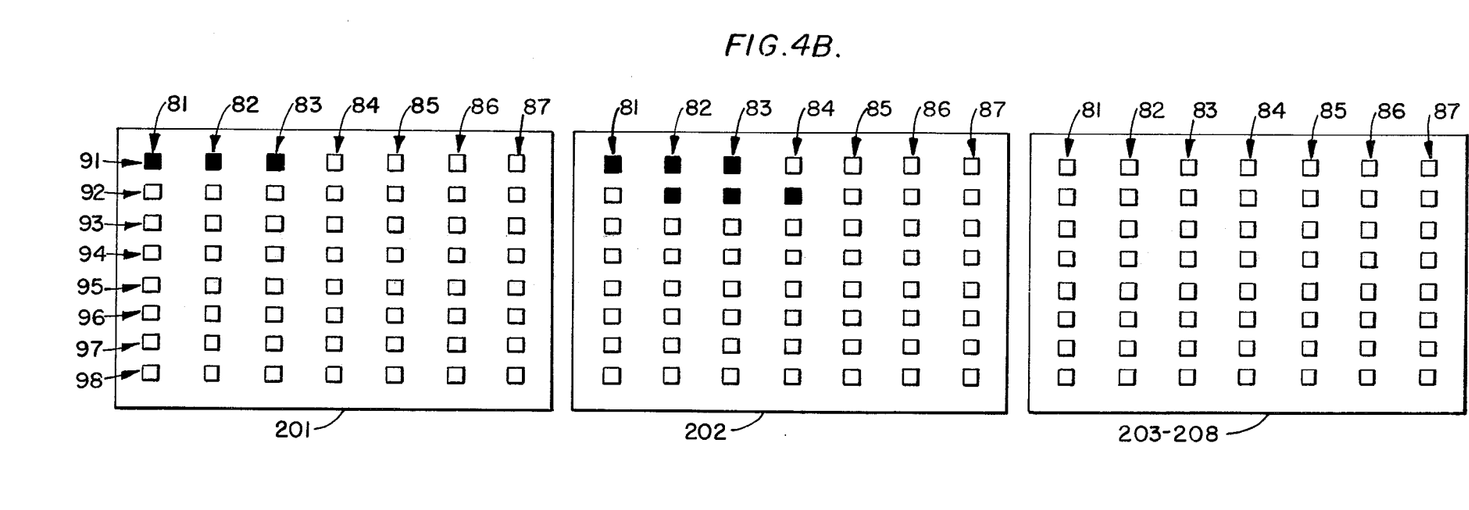
FIG. 4B is a schematic plan view similar to FIG. 4A showing three keyboards having 56 keys each with selected keys actuated.

In accordance with the method used in this illustrative example, the operator of each console 201–208 is assigned one of the rows 91–98 and must restrict his responses to that row. The operator of the console 201 is assigned the row 91, the operator of the console 203 is assigned the row 93, the operator of the console 204 is assigned the row 94, the operator of the console 205 is assigned the row 95, the operator of the console 206 is assigned the row 96, the operator of the console 207 is assigned the row 97, and the operator of the console 208 is assigned the row 98. Assigning each operator a row is one method of preserving the anonymity of each operator. Aside from knowing his own row number, the operator of a console does not know what row has been assigned to the other console operators. For example, the operator of the console 201, assigned the row 91, cannot readily associate an illuminated lamp 28 in the rows 92–98 with another operator. Each one of the consoles 201–208 is positioned so that each group member can verbally communicate with other group members, but cannot observe the operation of another group members' keyboard 24. A preferable placement is to mount each console on a table, the tables being arranged to form a circle. Each group member then sits at a table facing the other group members. The opaque observation shield 36 on each console 201–208 and the physical placement of the consoles 201–208 prevents one group member from viewing keyboard 24 responses made by another group member. Each of the consoles 201–208 have their receive controls 302 in the NO position and their transmit controls 304 in the NO position. The operator of the console 201 depresses the recording keys 26 in the locations (201) (91:81), (201) (91:82), and (201) (91:83). The lamps 28 located beneath each depressed recording key 26 in the row 91 illuminate as represented by the darkened squares in the row 91 of the console 201 in the FIG. 4A. The lamps 28 below each depressed recording key 26 illuminate by means of an electrical circuit described below. The operator of the console 202 depresses the recording keys 26 in the positions (202) (92:82), (202) (92:83), and (202) (92:84). The lamps located beneath each depressed recording key 26 in the row 92 illuminate as represented by the darkened squares in the row 92 of the console 202 in the FIG. 4A. As stated above, all the consoles 201–208 have their receive controls 302 in the NO position, and their transmit controls 304 in the NO position. In this NO-transmit and NO-receive mode no lamp 28 illuminating signals are transmitted or received by any of the consoles 201–208. If the operator of the console 201 elects to transmit lamp 28 illuminating signals to the remaining consoles, he moves his transmit control (201) 304 to the YES position. When the transmit control (201) 304 is in the YES position, electrical signals capable of illuminating the lamps 28 in the location (91:81), (91:82), and (91:83) on the remaining consoles 202–208 are transmitted from the console 201. Because all the potential receiving consoles 202–208 have their receive controls 302 in the NO position, none of the potential receiving consoles 202–208 are in a condition to receive the lamp 28 illuminating signals transmitted from the console 201. If the operator of the console 202 elects to receive any lamp 28 illuminating signals being transmitted by any of the transmitting consoles 201, 203–208, the operator of the console 202 moves his receive control (202) (302) to the YES position. The console 202 is thereby placed in a condition to receive the lamp 28 illuminating signals transmitted by the console 201. In response to the signals transmitted by the console 201, the lamps 28 in the locations (202) (91:81), (202) (91:82), (202) (90:83) will illuminate as represented by the darkened squares in the row 91 on the console 202 in FIG. 4B. The operator of the console 201 will continue to observe the illuminated lamps 28 beneath the depressed recording keys 26 at the locations (201) (91:81), (201) (91:82), and (201) (91:83). The operator of the console 202 will continue to observe the illuminated lamps 28 beneath the depressed recording keys 26 to the locations (202) (92:82), (202) (92:83), and (202) (92:84) and will also observe the illuminated lamps 28 beneath the undepressed recording keys 26 at the locations (202) (91:81), (202) (91:82), and (202) (91:83) being illuminated by signals being transmitted over the electrical cable 22 by the operator of the console 201. The operators of the consoles 203–208 do not observe any lamps 28 illuminated on their consoles 203–208, because their receive controls 302 are in the NO position. Since the operator of the console 202 does not know the operator/row assignment, he cannot associate the appearance of illuminated lamps 28 in the row 91 with the operator of the console 201.

Figure 4C:
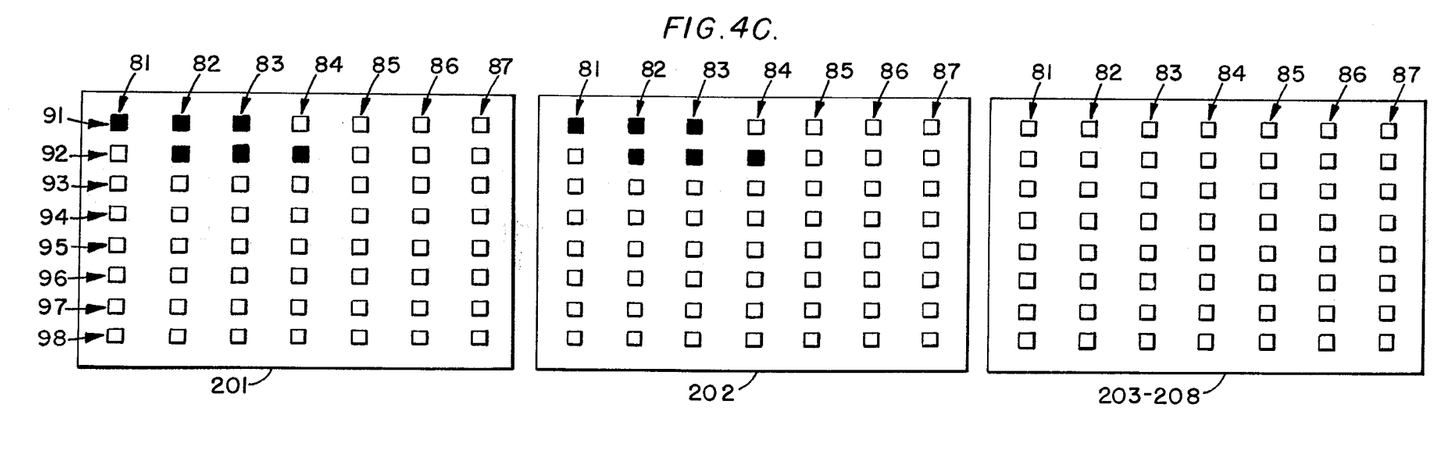
FIG. 4C is a schematic plan view similar to FIG. 4B showing three keyboards having 56 keys each with selected keys actuated.
Figure 4D:
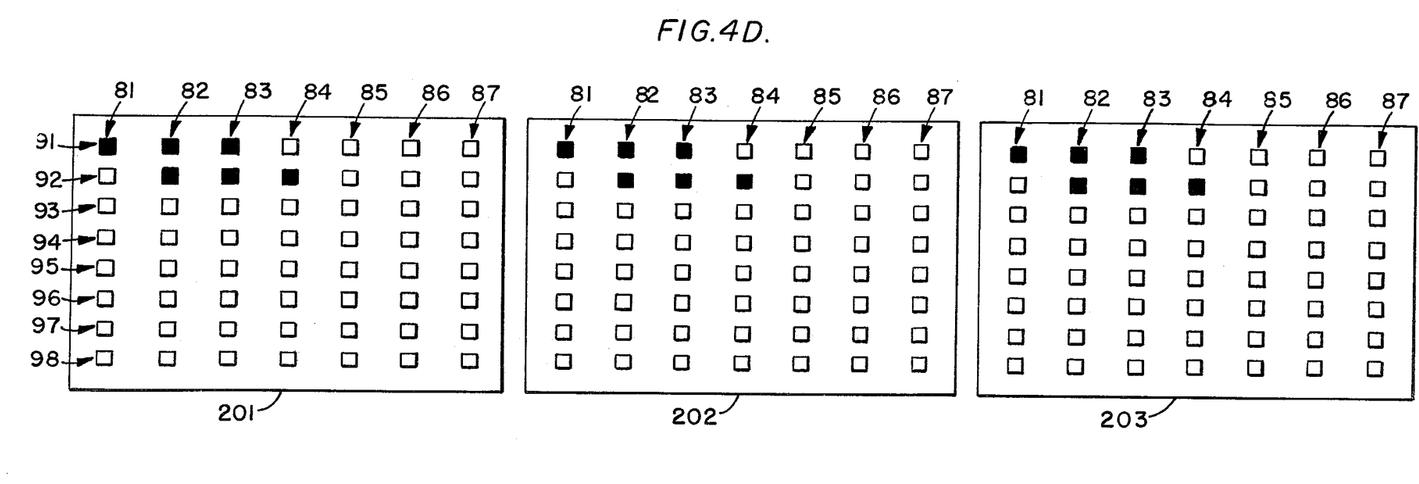
FIG. 4D is a schematic plan view similar to FIG. 4C showing three keyboards having 56 keys each with selected keys actuated.

If the operator of the console 201 should elect to receive any lamp 28 illuminating signals being transmitted from another console, he places his receive control 302 in the YES position. The console 201 is thereby placed in a condition to receive the lamp 28 illuminating signals transmitted by the console 202 when the transmit control (202) (304) is in the YES position. In response to the signals transmitted by the console 202, the lamps 28 in the locations (201) (92:82), (201) (92:83), and (201) (92:84) illuminate as represented by the darkened squares on the console 201 in FIG. 4C. The operator of the console 201 will continue to observe the illuminated lamps 28 beneath the depressed recording keys 26 at the locations (201) (91:81), (201) (91:82), and (201) (91:83) and will also observe the illuminated lamps 28 beneath the undepressed recording key 26 at the locations (201) (92:82), (201) (92:83), and (201) (92:84) being illuminated by signals transmitted over the electrical cable 22 by the operator of the console 202. The operators of the consoles 203–208 do not observe any lamps 28 illuminate on their consoles, since their receive controls 302 are in the NO position. Since the operator of the console 201 does not know the operator/row assignment, he cannot associate the appearance of illuminated lamps 28 in the row (201) 92 with the operator of the console 202. Should the operator of any of the remaining consoles 203–208 elect to receive lamp 28 illuminating signals being transmitted from another console(s) they place their receive control 302 in the YES position. For instance, if the operator of the console 203 elects to receive lamp 28 illuminating signals being transmitted from other consoles, he places his receive control (203) 302 in the YES position. When the receive control (203) 302 is in the YES position, the console 203 is placed in a condition to receive the lamp 28 illuminating signals transmitted from the console 201 and 202. As shown in FIG. 4D, the lamps in the location (203) (91:81), (203) (91:82), and (203) (91:83) will illuminate in response to the signals transmitted from the console 201 and the lamps 28 in the location (203) (92:82), (203) (92:83), and (203) (92:84) will illuminate in response to the signals being transmitted from the console 202. Since the operator of the console 203 does not know the operator/row assignment, he cannot associate the appearance of illuminated lamps 28 in the row (203) 91 with the operator of the console 201 or the appearance of illuminated lamps 28 in the row (203) 92 with the operator of the console 202.

As demonstrated in the above example, the sequence followed in transmitting responses from a first transmitting console to a second receiving console is to first have the transmitting console switched to the transmit YES mode and second, have the receiving console switched to the receive YES mode. In this (a) transmit, (b) receive sequence, the operator of the transmitting console is assured anonymity.

The operator of the prior consoles (disclosed in the referenced application could elect to transmit lamp 28 illuminating signals from his console by actuating a display mode switch (switch 34 in FIG. 2 of the referenced application) from an individual display mode (analogous to transmit NO mode of the preferred embodiment of the present invention) to a group display mode (analogous to the transmit YES, receive YES mode of the preferred embodiment of the present invention). None of the prior consoles were equipped with a means to allow a console operator to elect to receive or not receive signals transmitted from the other consoles. The transmit only feature of the prior consoles tended to compromise the anonymity of the operator(s) transmitting responses. It is possible that the operator of the prior console could successfully discover the identity of a transmitting console operator. As described above, the observation shield prevented the person receiving the responses from observing another's keyboard, or hand and finger movement during key and switch actuation. The observation shield did not prevent the receiving operator from observing another's facial expression, body, and arm movement. A receiving console operator could observe the facial expressions, body, and arm motions of a portion of the other console operators and simultaneously observe his keyboard 24 with his peripheral vision. In a percentage of trials, a console operator could associate slight facial, body, arm, and hand movements of another console operator as well as the sound of a switch being actuated with the simultaneous appearance of illuminated lamps 28 on his console. A portion of the operators of the prior consoles, upon discovery of the possible loss of anonymity, would modify their responses to gain the approval or avoid the disapproval of the person receiving the responses. For reasons discussed in the referenced application, this response alteration is undesirable. Users of the prior consoles sought to minimize the possible loss of anonymity by instructing all the console operators to switch into the group display mode substantially simultaneously. In practice, it proved difficult to have a plurality of operators switch to the group display mode substantially simultaneously. Some operators would switch to the group display mode either prior to or subsequent to the time the majority of the operators switched to the group display mode. The operators who either led or lagged the majority had the greatest probability of losing their anonymity.

As illustrated by the preceeding group communication example, the preferred embodiment of the present invention overcomes the limitation of the prior consoles by providing each console with both a transmit control 304 for the elective transmission of responses, and a receive control 302 for the elective receiving of responses. The anonymity of each console operator is assured by using the (a) transmit, (b) receive sequence.

Since the lamps 28 illuminate simultaneously when the operator of the receiving console places his receive control 302 in the YES position, the receiving operator cannot associate the illumination of any one lamp 28 with any other operator. The operators electing to transmit responses thus retain their anonymity.

Figure 3B:
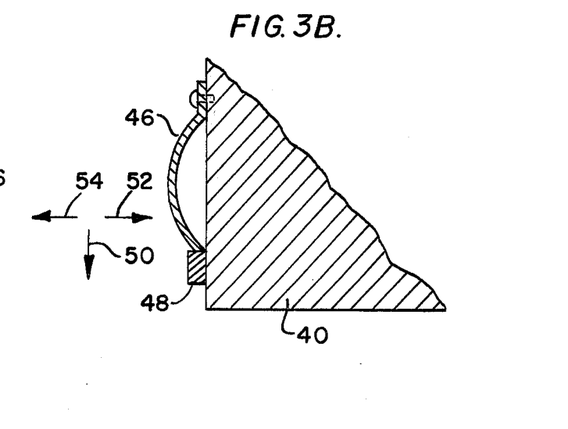
FIG. 3B is a partial cross section view of a latching means portion of the keyboard key switch and indicator assembly illustrated in FIG. 3A.

Each of the 56 recording keys 26 per console is operably coupled to a switch and indicator assembly 38 illustrated in FIG. 3A having an undepressed position and a depressed position with means to latch into the depressed position. A commercially available assembly successfully used in a prototype of the preferred embodiment of the present invention has eight latching key actuated switches formed into a column with an unlatching key at the base of the column. The assembly is identified as Part No. L7SO9322P16W00, and is manufactured by the UID Electronic Corporation of Hollywood, Florida. Since the structure of each switch and indicator assembly 38 is identical, the structure of the switch and indicator assembly 38 at the position (91:81) will be described as illustrative of the structure of all the switch and indicator assemblies 38. As shown in FIG. 3A, each recording key 26 is operably coupled to any well known double pole double throw slide switch 40 through interponent 42 and is urged toward the undepressed position by a resilient coil spring 44. An illuminatable lamp 28 is located below the recording key 26 surface to display illuminated evidence of a response by means of an electrical circuit described below. The key 26 is detachably attached to the interponent 42 to allow replacement of the lamp 28 and is fabricated from a translucent material, preferably plastic, to transmit light from the lamp 28 to the operator. When each recording key 28 is depressed, the switch and indicator assembly 38 latches into the depressed position by means of any well known latching means such as resilient leaf spring 46 and latch pin 48. The latch pin 48 is operably coupled to the key 26 by means not shown and as shown in FIG. 3B, when the recording key 26 is depressed, the latch pin 48 moves downward in the same direction as the arrow 50, and the leaf spring 46 moves in the direction of the arrow 52 to prevent the upward movement of the latch pin 48, thereby latching the switch and indicator assembly 38 and the recording key 26 into the depressed position. When a recording key 26 is depressed, the lamp 28 associated with the recording key 26 illuminates by means of the electrical circuits described below. A cancel key 30 located below each column 81-87 is operably coupled to the leaf spring 46 of each switch and indicator assembly 38 in the column by a sliding link (not shown). Depressing the cancel key 30 causes the sliding link (not shown) to displace each leaf spring 46 in the column above the cancel key 30 in the direction of the arrow 54 allowing the bias spring 44 to displace the latch pin 48 and key 26 upward, thereby returning the switch and indicator assembly 38 to the unlatched, undepressed position. The power switch 32, which may be a rocker switch, is used to apply electrical power to each console through a power supply circuit described below.

Figures 10, 11:
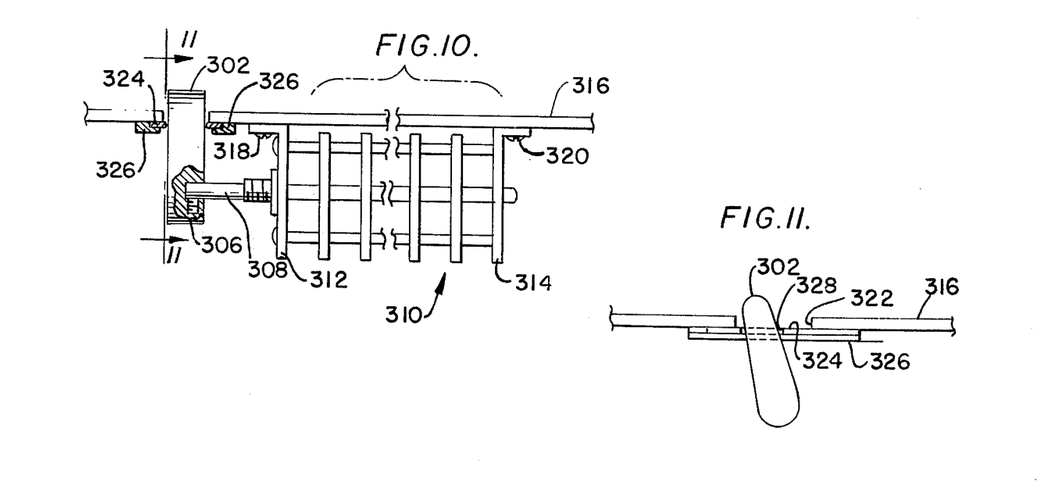

As shown in FIG. 10, the receive control 302 is secured by securing means such as set screw 306 to the shaft 308 of the receive switch 310. The receive switch 310 is a two position multi-pole rotary switch mounted on the brackets 312 and 314. The brackets 312 and 314 are fastened to the console faceplate 316 by fastening means such as threaded fasteners 318 and 320.

The electrical lugs to which certain leads described below are affixed have been omitted from FIG. 10 for reason of clarity. As shown in FIG. 11, the faceplate 316 includes an opening 322 through which the receive control 302 extends. A dust shield 324 is carried by guides 326 affixed to the faceplate 316. The dust shield 324 includes an opening 328 through which the receive control 302 extends. When the receive control 302 is actuated from one of its positions to the other, the dust shield 324 slides in the guides 326. Sufficient clearance is provided between the receive control 302 and the opening 328 to prevent binding when the receive control 302 is actuated. The transmit switch 334 (not shown) is identical in structure to the receive switch 310 shown in FIG. 10 and FIG. 11.

A commercially available rotary switch successfully used in a prototype of the preferred embodiment for both the transmit switch 334 and the receive switch 310 is Part No. PA550-110 manufactured by the Centralab Electronics Division of Globe-Union Incorporated of 5757 North Green Bay Avenue, Milwaukee, Wisc., 53201. The Centralab switch is a 60 pole two position rotary switch.

Figure 7:
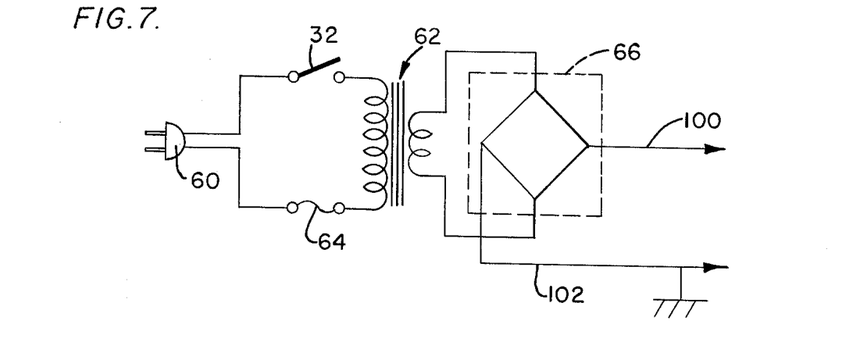
FIG. 7 is a circuit diagram of a typical power supply which may be utilized with the present invention.
Figure 8:
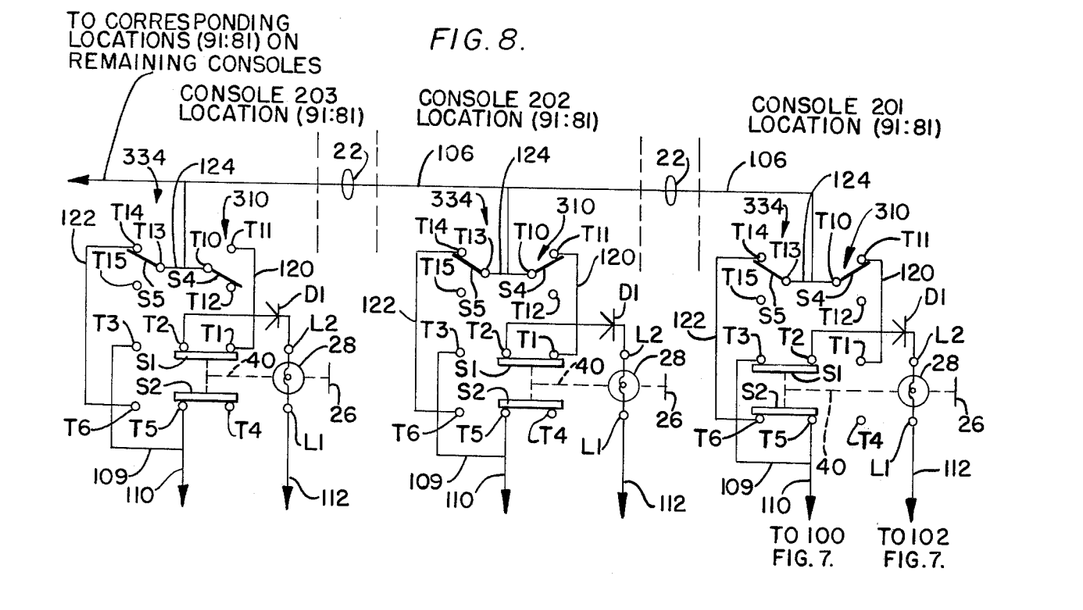
FIG. 8 is a circuit diagram of a typical switch and indicator assembly in three separate response recording and display consoles.
Figure 9:
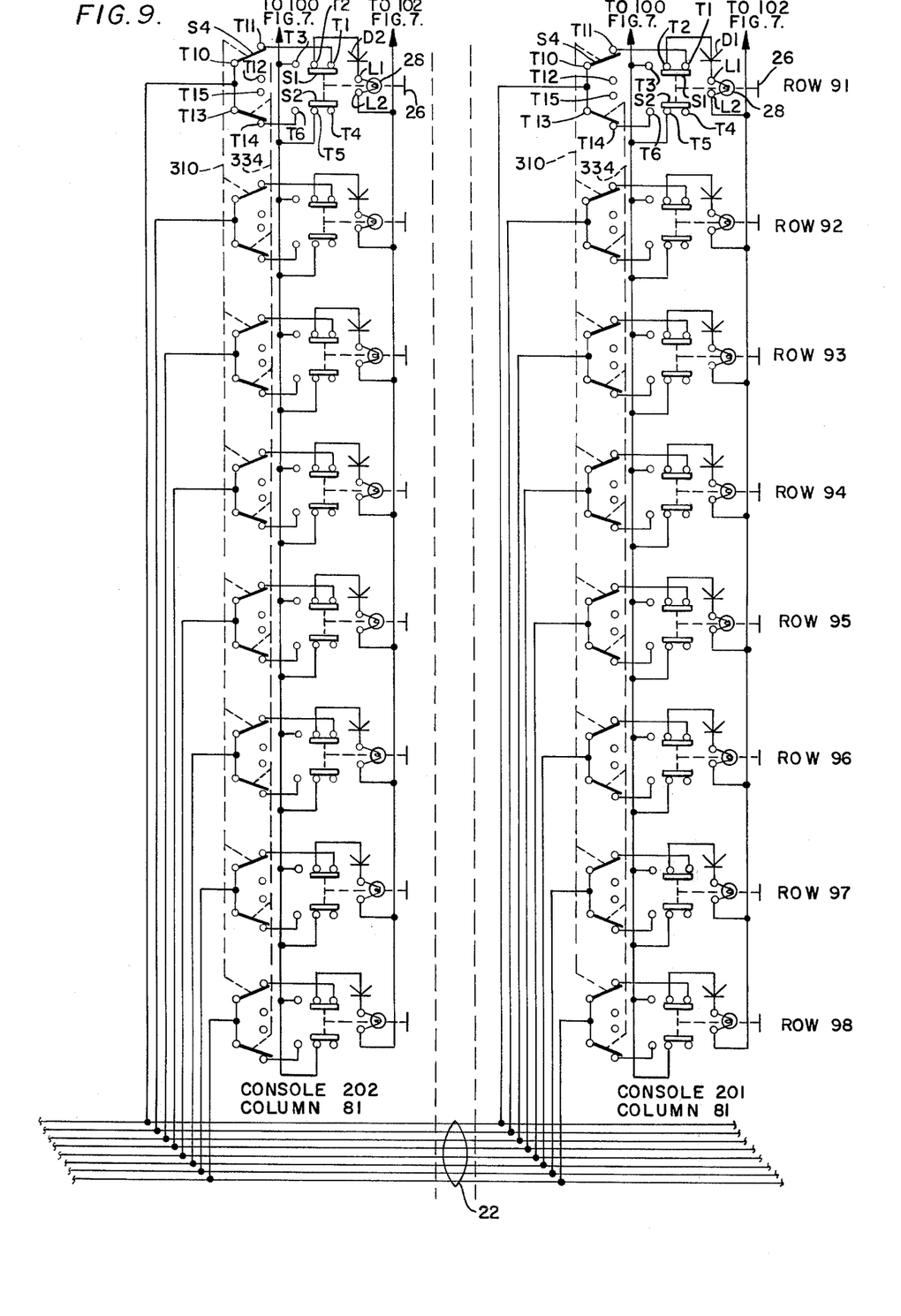
FIG. 9 is a circuit diagram of a typical column of switch and indicator assemblies on two separate response recording display consoles.

The consoles 201-208 perform the response recording, response transmitting, and response receiving functions by means of the electrical circuits illustrated in FIGS. 7, 8, and 9. FIG. 7 is a typical power supply circuit which may be utilized to supply operating power to the group of consoles 201-208. FIG. 8 illustrates the parallel wiring relationship between a representative switch and indicator assembly 38 at the location (91:81) on the console 201 and its corresponding switch and indicator assembly 38 at the location (91:81) on the consoles 202, 203, and 204-208. FIG. 9 illustrates the parallel wiring between a representative column 81 of switch and indicator assemblies 38 on the console 201 and its corresponding column 81 of switch and indicator assemblies 38 on the consoles 202, and 203-208. The wiring of the consoles 201-208 is a repetition of the basic parallel wiring circuit used to couple each switch and indicator assembly 38 at one location on each console 201-208, and is repeated for each of the 56 switch and indicator assemblies 38 locations. A circuit description of the switch and indicator assembly 38 at the position (91:81) as illustrated in FIG. 8, and of the column 81 of switch and indicator assemblies 38 as illustrated in FIG. 9 is sufficient to provide an understanding of all the circuitry of the consoles 201-208.

The consoles 201-208 receive their operating electrical power through the power supply circuit illustrated in FIG. 7 including a power connector 60 electrically coupled to the primary of a step down transformer 62 through the power switch 32 and the protective fuse 64. A solid state bridge rectifier 66 is electrically coupled to the secondary of the transformer 62. The output of the power supply is an unfiltered 24 volt DC potential supplied between the lead 100 and the lead 102. The lead 102 is at zero potential and is hereinafter referred to as ground. The lead 100 is at a potential of plus 24 volts DC with respect to ground. The 24 volt DC potential is hereinafter referred to as the supply voltage. Each of the consoles 201-208 may have its own power supply or two or more of the consoles 201-208 may share the same power supply.

As shown in FIG. 8, each slide switch 40 consists of a set of electrical contacts which provide both a single pole-single throw and a single pole-double throw switching function. Each slide switch 40 acts in cooperation with a set of electrical contacts on the receive switch 310 which provides a single pole-double throw function, and a set of electrical contacts on the transmit switch 334 which provide a single pole-double throw function. The structure and electrical function of the switch 40 in the location (91:81) on the console 201 with its associated electrical contacts on the receive switch 310 and the transmit switch 334 as shown in FIG. 8 will be described as illustrative of all the switches 40. Each switch 40 has six terminals; T1, T2, T3, T4, T5 and T6 and two moveable electrically conductive slides, S1 and S2 to provide electrically conductive paths between the terminals. The slides S1 and S2 are mechanically linked to both the recording key 26 (FIG. 3A) and to one another but are electrically insulated from one another. The switch and indicator assembly 38 is urged to the undepressed state by the spring 44 (FIG. 3A). In the undepressed position, the slide S1 establishes electrical contact between the terminal T1 and the terminal T2, and the slide S2 establishes electrical contact between the terminal T4 and the terminal T5 as shown by the undepressed switch 40 in the location (91:81) on the console 202 in the FIG. 8. When the key 26 is depressed, the slide S1 is moved so as to interrupt the electrical contact between the terminal T1 and the terminal T2, and establish electrical contact between the terminal T2 and the terminal T3, and the slide S2 is moved so as to interrupt the electrical contact between the terminal T4 and the terminal T5 and establish electrical contact between the terminal T5 and the terminal T6, as shown by the depressed switch 40 in the position (91:81) on the console 201 in the FIG. 8. Each switch 40 is associated with three terminals, T10, T11, and T12 and an electrically conductive link S4 on the receive switch 310 and three terminals T13, T14, and T15 and an electrically conductive link S5 on the transmit switch 334. When the conductive link S4 establishes electrical contact between the terminal T10 and the terminal T11 the receive switch 310 is in the YES position. When the conductive link S4 establishes contact between the terminal T10 and the terminal T12 the receive switch 310 is in the NO position. When the conductive link S5 establishes contact between the terminal T13 and the terminal T14 the transmit switch 334 is in the YES position. When the conductive link S5 establishes contact between the terminal T13 and the terminal T15 the transmit switch 334 is in the NO position. Each lamp 28 has two terminals, terminal L1 and the terminal L2. The terminal T1 of each switch 40 is electrically coupled to the terminal T11 of the receive switch 310 through the lead 120. A diode D1 electrically couples the terminal T2 of each switch 40 to the terminal L2. The anode of the diode D1 is electrically coupled to the terminal T2 and the cathode of the diode D1 is electrically coupled to the terminal L2. The terminal T3 of each switch 40 is electrically coupled by lead 109 to the supply voltage available to the lead 100 of the power supply illustrated in FIG. 7. The terminal T4 of each switch 40 is not used. The terminal T5 of each switch 40 is electrically coupled by the lead 110 to the supply voltage available at the lead 100 of the power supply. The terminal T6 of each switch 40 is electrically coupled to the terminal T14 of the transmit switch 334 through the lead 122. The terminal L1 of each lamp 28 is electrically coupled through the lead 112 to the electrical ground at the lead 102 shown in FIG. 7. The terminal T13 of the transmit switch 334 is electrically coupled by the lead 124 to the terminal T10 of the receive switch 310. Both the terminal T13 and the terminal T10 are electrically coupled to the terminal T10 and T13 of each receive switch 310 and transmit switch 334 in the remaining consoles 202–203 through the lead 106 which is contained within the cable 22. The terminal T15 of the transmit switch 334 and the terminal T12 of the receive switch 310 are not used.

When the recording key 26 in the position (91:81) on the console 201 is depressed to the response recording position, the slide S1 interrupts the electrical contact between the terminal T1 and the terminal T2, and establishes electrical contact between the terminal T2 and the terminal T3, and the slide S2 interrupts the electrical contact between the terminal T4 and the terminal T5, and establishes electrical contact between the terminal T6 and the terminal T5. When the slide S1 establishes contact between the terminal T2 and the terminal T3, the supply voltage flows from the lead 100 of the power supply illustrated in FIG. 7 through the lead 109 to the terminal T3, through the slide S1 to the terminal T2, through the diode D1 to the terminal L2 of the lamp 28, through the filament of the lamp 28, through the terminal L1 of the lamp 28, and through the lead 112 to the ground. The current flowing through the lamp 28 causes the lamp 28 to illuminate. The light emitted from the illuminated lamp 28 serves to indicate a response to the console 201 operator. When depressed to the response recording state, the switch and indicator assembly 38 latches into the depressed state by means of the latching means illustrated in FIG. 3A and FIG. 3, and described hereinabove.

If the transmit switch 334 is in the YES position, the conductive link S5 establishes electrical contact between the terminal T13 and the terminal T14. With the switch 40 in the location (201) (91:81) remaining in the depressed, response recording position, the supply voltage flows from the power supply lead 100 shown in FIG. 7 through the lead 110 to the terminal T5, through the link S2 to the terminal T6, through the lead 122 to the terminal T14, through the conductive link S5 to the terminal T13, and through the lead 124 to the lead 106. The supply voltage flows from the lead 106 to each of the terminals T13 of the transmit switches 334, and to each of the terminals T10 of the receive switches 310 on each of the remaining consoles 202–208. If the receive switch 310 on any of the remaining consoles is in the YES position, (see FIG. 8, console 202, switch 310) the supply voltage carried by the lead 106 will pass to the terminal T10, through the conductive link S4, to the terminal T11, through the lead 120, through the conductive link S1 to the terminal T2, through the diode D1 to the terminal L2 of the lamps 28, through the filaments of the lamps 28 to the terminals L1, through the leads 112 to the ground. The current flowing through each lamp 28 associated with each undepressed key 26 of the remaining consoles 202–208 causes each lamp 28 to illuminate. The illuminated lamps 28 on each of the consoles 202–208 having their receive switches 310 in the YES position serve as a visual indication to the operators of the consoles 201–208 that one of the operators has depressed the key 26 in the location (91:81) and placed his transmit switch 334 in the YES position. In the event a receive switch 310 on a console is in the NO position, (see FIG. 8, console 203, switch 310) no lamps 28 will be caused to illuminate. The purpose of the diode D1 between the terminals T2 and L2 is to prevent stray electrical currents from causing the lamps 28 to unintentionally illuminate. FIG. 9, showing a column 81 on two separate consoles 201 and 202 demonstrates the repetition of the basis circuit shown in FIG. 8.

The group of consoles as described above may be utilized for a variety of group communication situations including testing, training, education, and evaluation. The examples presented in the referenced application illustrate the manner in which the present invention may be utilized and are not intended to limit the scope of the present invention.

As is apparent to those skilled in the art, various changes and modifications may be made to the interconnected consoles described herein without department from the spirit and scope of the present invention.

What is claimed is:

1. An apparatus for the selective transmitting and receiving of responses between a plurality of console operators comprising:
   a plurality of response recording and display consoles; electrical interconnection means operably coupling the console;
   each console including a plurality of electrical switches each having a plurality of stable states including a response recording state and a non-response recording state;
   each console including a plurality of response indicating lamps;
   each lamp on a console operably associated through electrical circuitry with a corresponding one of the switches on the console whereby actuation of a switch to the response recording state causes the corresponding one of the lamps on the console to illuminate;
   each lamp operably associated through the electrical circuitry and the interconnection means with a corresponding one of the lamps on each of the other consoles;
   each console including a console operator actuatable transmit switch interposed in the electrical circuitry adapted to simultaneously reversibly couple all illuminated lamps on a console with the corresponding lamps on each of the other consoles; and
   each console including a console operator actuatable receive switch interposed in the electrical circuitry adapted to simultaneously reversibly de-couple all lamps on a console with the corresponding illuminated lamps on each of the other consoles.

2. The apparatus as recited in claim 1, in which each switch further includes;
   a key actuated bi-state electrical switch.

3. The apparatus as recited in claim 1, further comprising;
   means operably coupling the switches to the response indicating lamps whereby actuation of a switch to the response recording state causes the corresponding response indicating lamp to enter the response indicating state.

4. The apparatus as recited in claim 3 in which;
   the response recording switches are so located as to form an ordered array.

5. The apparatus as recited in claim 4 in which;
   the ordered array further includes rows and columns of response recording switches.

6. The apparatus as recited in claim 3 in which;
   the response indicating lamps are so located as to form an ordered array.

7. The apparatus as recited in claim 6 in which;
   the ordered array further includes rows and columns of response indicating lamps.

8. The apparatus as recited in claim 3 further comprising;
   latching means operably coupled to each response recording switch for latching each response recording means into the response recording state.

9. The apparatus as recited in claim 8 further comprising;
   unlatching means operably coupled to the latching means of each response recording switch to unlatch a response recording switch from the response recording state.

10. The apparatus as recited in claim 3 wherein;
    the response indicating lamps are located within corresponding ones of the response recording switches.

11. The apparatus as recited in claim 1, further comprising;
    a replaceable template for each console formed from sheet material having a plurality of apertures corresponding to the response recording means.

12. The apparatus as recited in claim 11 in which;
    the template has a portion adjacent to at least one aperture with printed matter whereby the operator of a console may perceive functions relating to the use of the response recording means.

13. The apparatus as recited in claim 12 in which;
    the printed matter is a bi-value question whereby the console operator may respond to the bi-value question by actuating the response recording means adjacent to the bi-value question.

14. The apparatus as recited in claim 13 in which;
    the printed matter adjacent to selected apertures in a row of response recording means relates to a multi-value question whereby the console operator may respond to the multi-valve question by actuating at least one of the response recording means in the row of response recording means.

15. The apparatus as recited in claim 12 in which;
    the printed matter adjacent to selected apertures in a column of response recording means relates to a multi-value question whereby the console operator may respond to the multi-value question by actuating at least one of the response recording means in the column of response recording means.

16. The apparatus as recited in claim 1, further comprising;
    a replaceable template for each console formed from sheet material having a plurality of apertures so located as to correspond in position with each response indicating display means.

17. The apparatus as recited in claim 16 in which;
    printed matter is located on the template adjacent selected apertures whereby the operator of a console may perceive the significance of selected response indicating display means.

18. The apparatus as recited in claim 1, further comprising;
    observation shield means associated with the consoles.

* * * * *